Oct. 6, 1942.           J. BERARDO           2,297,937
SMOKER'S PIPE
Filed Aug. 25, 1941
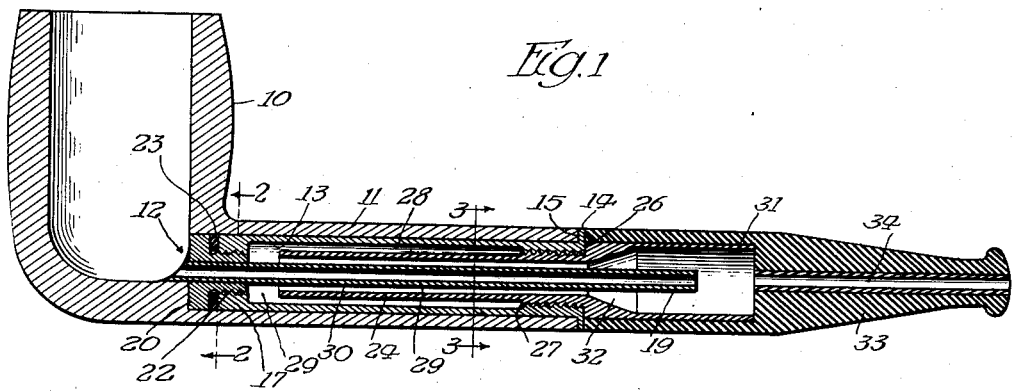
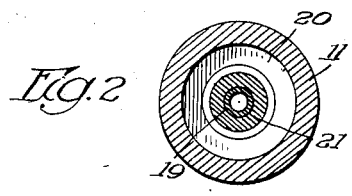 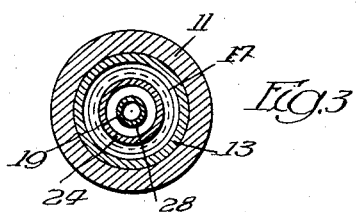
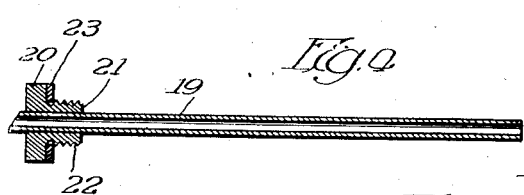 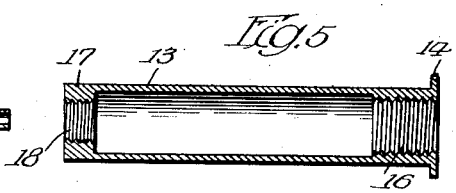
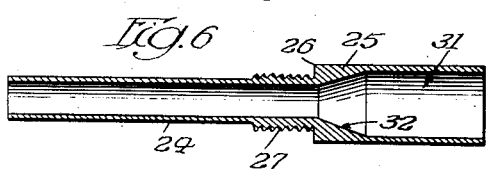
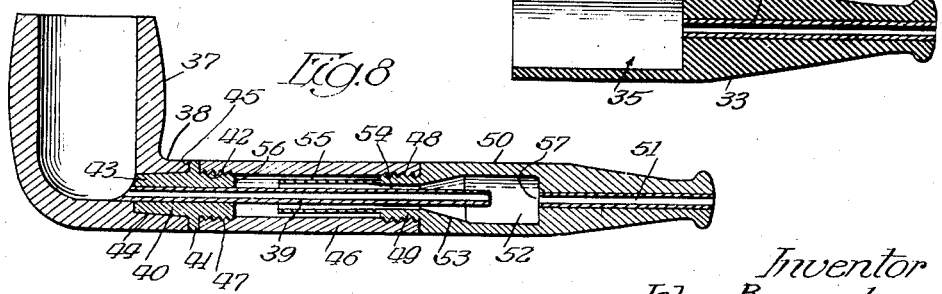
Inventor
John Berardo
By [signature] Atty Patented Oct. 6, 1942

2,297,937

UNITED STATES PATENT OFFICE 2,297,937

SMOKER'S PIPE

John Berardo, Chicago, Ill.

Application August 25, 1941, Serial No. 408,138

4 Claims. (Cl. 131—211)

This invention relates to improvements in smoker's pipe, and one of the objects of the same is to provide in a pipe of this character simple, efficient and inexpensive means for catching and confining saliva and moisture.

A further object is to provide improved means in a pipe of this character, the parts of which may be readily separated and removed from the pipe for cleaning purposes, and as readily replaced and assembled.

To the attainment of these ends, and the accomplishment of other new and useful objects as will appear, the invention consists in the features of novelty in substantially the construction, combination and arrangement of the several parts, hereinafter more fully described and claimed and shown in the accompanying drawing illustrating this invention.

Figure 1 is a longitudinal sectional view of a pipe of this character, constructed in accordance with the principles of this invention.

Figure 2 is a detail sectional view, on an enlarged scale, taken on line 2—2, Figure 1.

Figure 3 is a detail sectional view, on an enlarged scale, taken on line 3—3, Figure 1.

Figure 4 is a sectional view of one of the elements of the pipe.

Figure 5 is a detail sectional view of another of the elements of the pipe.

Figure 6 is a detail sectional view of still another element of the pipe.

Figure 7 is a detail sectional view of the mouthpiece.

Figure 8 is a detail sectional view of a modified form of pipe.

Referring more particularly to the drawing and to the form of the invention shown in Figures 1 to 7, the numeral 10 designates a pipe bowl having the usual stem 11 connected thereto.

The stem 11 adjacent the pipe bowl is preferably of an internal diameter somewhat greater than the opening 12 which forms communication between the pipe and stem so as preferably to extend below the opening.

The numeral 13 designates a tubular element which is preferably of an external diameter only slightly less than the internal diameter of the stem 11, and is adapted to be inserted into the stem so as to be held firmly therein by friction.

At one end of the tubular member 13 there is provided a flange 14, which is adapted to abut the free end of the stem 11. This tubular member 13 is preferably of a length less than the length of the stem, for a purpose to be described.

The end of the tubular member 13 at which the flange 14 is located, is provided with internal screw threads 16, and the opposite end of this tubular member is preferably provided with an end wall 17 having a threaded opening 18 therethrough. The diameter of the opening 18 is preferably less than the diameter of the threaded portion 16.

The numeral 19 designates another tubular member which is of an external diameter considerably less than the internal diameter of tubular member 13, and connected with and encompassing one end of the tubular member 19 is a plug 20 having a reduced portion or stem 21, the latter being provided with external screw threads 22.

The diameter of the reduced portion 21 is such that it will fit within the opening 18 of the tubular member 13 so that the threads thereon will engage the threads in the opening to screw these parts together. If desired, a suitable packing 23 may be disposed between the body of the plug 20 and the end of the tubular member 13 to encompass the opening 18, and thereby form a fluid tight joint.

The tubular member 19 is of a length to project through the tubular member 13 and to terminate at a point considerably beyond the end of the member 13.

A third tubular member 24 having an enlarged portion 25 forming a tubular head, is also provided to co-operate with the tubular members 13 and 19. The head 25 of this tubular member 24 is of an external diameter greater than the external diameter of the portion 24, so as to form a shoulder 26, and adjacent the shoulder 26 screw threads 27 are provided. The diameter of the threaded portion 27 is slightly less than the internal diameter of the threaded portion 16, and the tubular member 24 is telescoped into the member 13 so that the threads 27 will engage the threads 16, and the shoulder 26 will abut the flange 14.

The external diameter of the portion 24 is considerably less than the internal diameter of the tubular member 13, to provide a space 28, and this tubular member 24 terminates short of the end 17 of the tubular member 13, to provide a space 29 communicating with the space 28 that encompasses the tubular member 24. This space 28 is closed at one end by the shoulder 26 of the member 24, to form a space for the reception and accumulation of saliva and moisture.

The external diameter of the tubular member 19 is considerably less than the internal diameter of the member 24, to form a space 30 that communicates with the space 29.

Within the head 25 is arranged a chamber 31 having a conical open portion 32 at its bottom which communicates with the tube 24.

The numeral 33 designates a mouthpiece having a passage 34 therethrough that communicates with an open chamber 35. The internal diameter of the chamber 35 is slightly larger than the external diameter of the head 25 of the tube 24, so that the head 25 may be telescoped into the chamber 35 with its open end abutting at shoulder 36, and is held in position preferably by means of friction, or in any other desired manner.

When the tubular member 24 and head 25 and mouthpiece 33 are thus fitted together, they constitute a unitary structure, and may be screwed to the stem 11 with the tubular member 24 projecting thereinto, by means of the threaded portion 27 engaging in the threaded opening 16 of the member 13.

The tubular member 19 is of a length to extend into the chamber 31, and is arranged in alinement with the passage 34 in the mouthpiece 33, but terminates short of such opening.

With this construction it will be manifest that when the parts are thus assembled, any saliva or moisture which may flow through the passage 34 will be deposited and will accumulate in the chamber 31, from where it will flow through the passage or space 30 between the tubular members 19 and 24, to be discharged into the space 29, and eventually into the space 28, where it will be trapped and will be prevented from flowing therefrom when the mouthpiece is lowered with respect to the bowl 10, by means of the shoulder 26 which forms a closure for the space 28.

By projecting the end of the tubular member 19 into the chamber 31, moisture will be prevented from flowing through the tubular member 19 into the bowl 10.

In order to empty the accumulated moisture, it is only necessary to unscrew or detach the mouthpiece 33, and this will cause tubular member 24 to be unscrewed from the tubular member 13, so that it may be withdrawn with the mouthpiece. The moisture then in the spaces 28 and 29 may be poured out of the opening 16.

If it is desired, the tubular member 19 may then be removed by withdrawing the tubular member 13, with the tubular member 19 attached thereto.

In the form of the invention shown in Figure 8, the bowl 37 is provided with a short stem 38, and a tubular member 39 corresponding to the tubular member 19 passes through and is screwed to a plug 40, which plug has a flange 41 intermediate its ends, one end 42 of the plug being screw-threaded and the other end 43 preferably being tapered. The tapered end 43 is adapted to be frictionally held within the passage 34, so that the flange 41 will abut the shoulder 45 on the stem 38. If desired, the end 43 of the plug 40 may be irregular in cross-section so as to prevent rotation of the plug within its seat.

In this form of the invention a stem section 46 provided with internal threads 47, at one end into which the threaded end of the plug 40 is screwed, may be provided, which may be constructed of any desired or suitable material and of any desired length. The other end of this member 46 is also provided with threads to receive the externally threaded reduced tubular portion of a mouthpiece 50, which latter has a passage 51 therethrough communicating with a chamber 52. One end of the chamber is provided with a conical portion 53, and the chamber 52 communicates, through a passage 54, with the interior of the member 46 to form a space 55, the opposite end of which is closed by the end 56 of the plug 40.

The tubular member 39 projects into the chamber 52 through the opening or space 54, and terminates short of the end 57 of the passage 51, but is preferably arranged in alinement with the opening in the passage 51.

In this form of the invention, the saliva will be collected in the chamber 52, and will flow through the passage 54 into the space 55, and when it is desired to remove the saliva and moisture, all that is necessary is to detach the mouthpiece 50 by unscrewing the same.

Likewise, the tube 39 may be removed by first removing the member 46 and then the plug 40.

While the preferred forms of the invention have been herein shown and described, it is to be understood that various changes may be made in the details of construction, and in the combination and arrangement of the several parts, within the scope of the claims, without departing from the spirit of this invention.

What is claimed as new is:

1. A pipe embodying a bowl, a stem, and a mouthpiece having a chamber, a moisture trap within the stem, said trap comprising concentrically arranged and spaced outer, inner, and intermediate tubular members of substantial length, one end of the outermost member being closed, and one end of the innermost member being secured in an opening in the said closed end, said innermost member extending through said outermost member and for a substantial distance beyond the other end thereof and into a chamber in the mouthpiece, said innermost member having communication with the bowl, the intermediate tubular member constituting an extension of said mouthpiece, passing into and forming a closure for that end of the outermost tubular member which is adjacent the said mouthpiece, whereby the moisture trap will be closed at both ends, said intermediate member terminating adjacent but spaced from the first said closed end of the said outermost tubular member, the moisture trap having communication with the mouthpiece only through that end of the said intermediate tubular member which is adjacent the pipe bowl, all of the said tubular members and the said mouthpiece being removable from the stem as an assembled unit.

2. A pipe embodying a bowl, a stem, and a mouthpiece having a chamber, a moisture trap within the stem, said trap comprising concentrically arranged and spaced outer, inner, and intermediate tubular members of substantial length, one end of the outermost member being closed, and one end of the innermost member being secured in an opening in the said closed end, said innermost member extending through said outermost member and for a substantial distance beyond the other end thereof and into a chamber in the mouthpiece, said innermost member having communication with the bowl, the intermediate tubular member constituting an extension of said mouthpiece, passing into and forming a separable closure for that end of the outermost tubular member which is adjacent the said mouthpiece, whereby the moisture trap will be closed at both ends, said intermediate member terminating adjacent but spaced from the first said closed end of the said outermost tubular member, the moisture trap having communication with the mouthpiece only through that end of the said intermediate tubular member which is adjacent the pipe bowl, all of the said tubular members as an assembled unit, or only the said mouthpiece with the tubular extension attached thereto, being selectively removable or detachable from the stem.

3. A pipe embodying a bowl, a stem, and a mouthpiece having a chamber, a tubular member within the stem separably connected to and communicating with the bowl, the external diameter of the tubular member being substantially less than the internal diameter of the stem, said tubular member being of a substantial length and extending into a chamber in the mouthpiece, a tubular extension on the mouthpiece telescoping with the said tubular member and extending into the stem and terminating adjacent but spaced from the bowl, said extension being disposed between the wall of the stem and the said tubular member and spaced from both of them, a portion of the said tubular extension of the mouthpiece forming a closure for the space in the stem, and which space encompasses another portion of the extension to provide a moisture trap closed at both ends, and with which trap the mouthpiece has communication only through that end of the said extension thereof which is adjacent the bowl, said mouthpiece and the extension thereof being detachably connected to the stem.

4. A pipe embodying a bowl, a stem, and a mouthpiece having a chamber, a tubular member within the stem separably connected to and communicating with the bowl, the external diameter of the tubular member being substantially less than the internal diameter of the stem, said tubular member being of a substantial length and extending into a chamber in the mouthpiece, a tubular extension on the mouthpiece telescoping with the said tubular member and extending into the stem and terminating adjacent but spaced from the bowl, said extension being disposed between the wall of the stem and the said tubular member and spaced from both of them, a portion of the said tubular extension of the mouthpiece forming a closure for the space in the stem, and which space encompasses another portion of the extension to provide a moisture trap closed at both ends, and with which trap the mouthpiece has communication only through that end of the said extension thereof which is adjacent the bowl, the bottom of the chamber in the mouthpiece being inclined and disposed intermediate the ends of the tubular member to direct the moisture through the said extension, around the said tubular member, and into the moisture trap, said mouthpiece and the extension thereof being detachably connected to the stem.

JOHN BERARDO.